United States Patent

[11] 3,615,845

[72] Inventor Foster L. Gray
    Dallas, Tex.
[21] Appl. No. 788,211
[22] Filed Dec. 31, 1968
[45] Patented Oct. 26, 1971
[73] Assignee Texas Instruments Incorporated
    Dallas, Tex.

[54] FUEL CELL ELECTROLYTE CONTROL
    2 Claims, 3 Drawing Figs.
[52] U.S. Cl. .................................................. 136/86
[51] Int. Cl. ............................................. H01m 27/20
[50] Field of Search ....................................... 136/86

[56]            References Cited
            UNITED STATES PATENTS
3,364,071   1/1968   Kordesch .................... 136/86
3,458,357   7/1969   Truitt ......................... 136/86
3,466,197   9/1969   Bawa .......................... 136/86

Primary Examiner—Winston A. Douglas
Assistant Examiner—H. A. Feeley
Attorneys—Samuel M. Mims, Jr., James O. Dixon, Andrew M. Hassell, Harold Levine, Melvin Sharp and Richards, Harris & Hubbard ABSTRACT: An electrolyte control system for a fuel cell which has an anode and a cathode spaced by an electrolyte carrying matrix wherein porous capillary conduits communicate from an electrolyte reservoir to points uniformly along the matrix. For example, the porous capillary conduits can be positioned uniformly along the matrix adjacent the cathode and thereby supply electrolyte directly to the cathode, and to the anode and matrix at whatever rate the matrix will absorb the electrolyte.

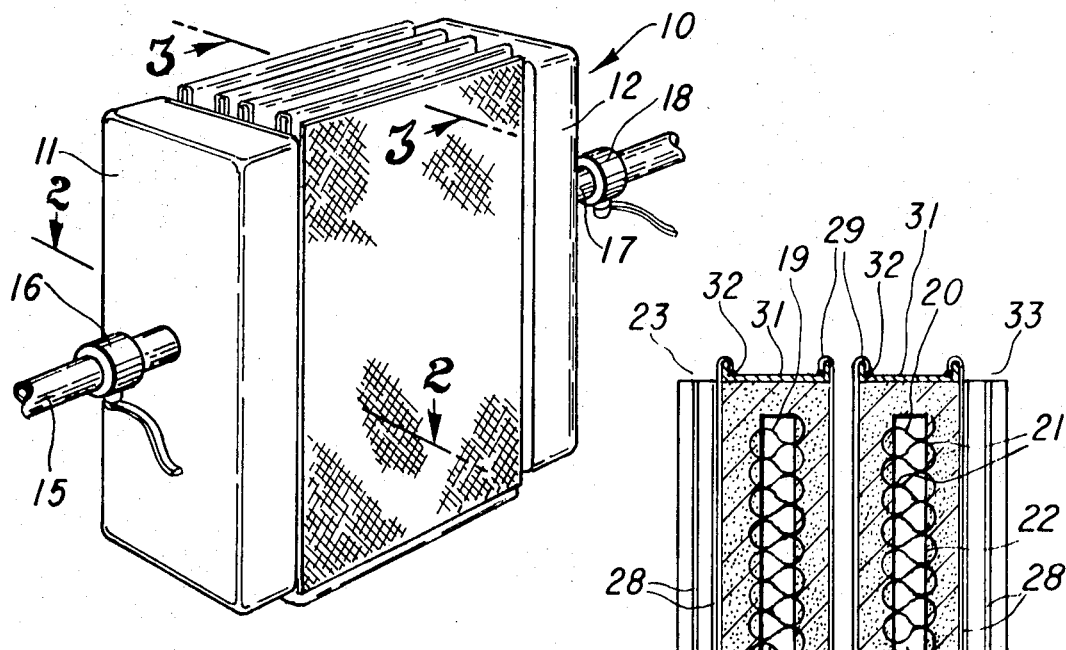
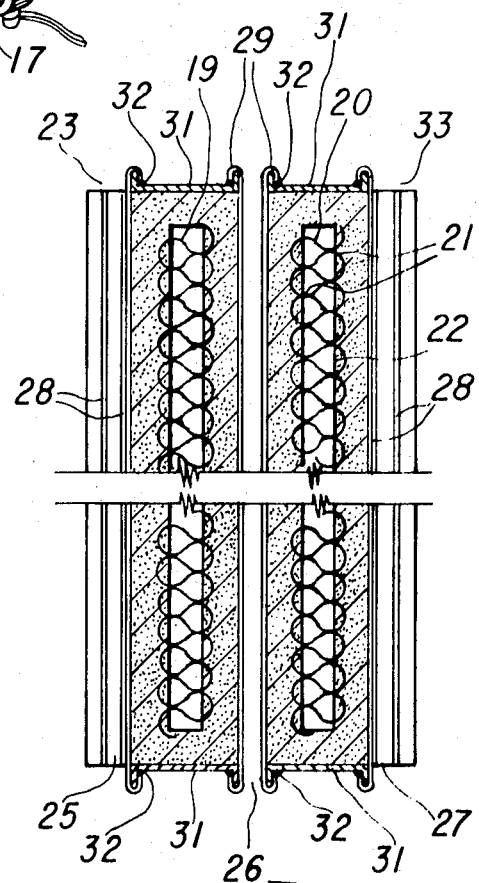
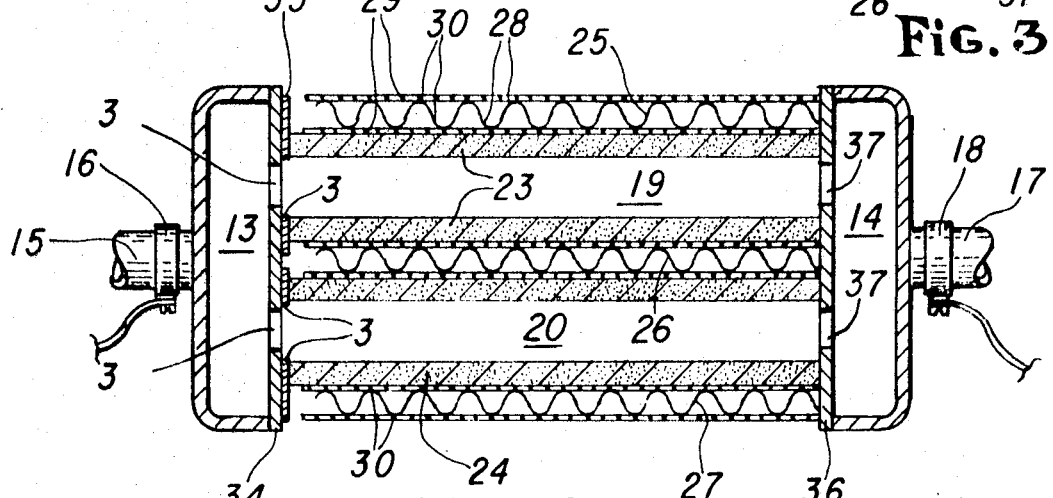
Fig. 1
Fig. 3
Fig. 2

FUEL CELL ELECTROLYTE CONTROL

This invention relates to fuel cells. In another aspect, this invention relates to the control of electrolyte flow to the electrodes of fuel cells.

A conventional fuel cell configuration includes a pair of porous, conductive electrodes spaced apart and contacted by an electrolyte which is carried by a matrix of a dielectric material, which provides a multiplicity of pores. In the operation of this cell, a suitable reactant gas is passed on one side of each electrode and contacts electrolyte in the porous structure of each electrode to provide for cell reaction. In cells of this type the inert matrix is in direct contact with a reservoir of electrolyte, and the electrolyte is fed by a wicklike action the matrix and the electrodes.

The present trend in fuel cell development is toward lighter, smaller, and thinner fuel cells. The trend has resulted in the development of closely spaced anodes and cathodes, and therefore in very thin but uniform electrolyte-containing matrices. Thus, it is necessary that the thin matrices utilized in these cells be uniform in thickness and porosity so that a substantially uniform contact of electrolyte is made with the surface of the electrodes.

One method of forming the thin matrices is initially to form molding composition of matrix material and then apply this material uniformly around the surface of an electrode, for example, the anode. The cathode is then placed against the exposed surface of the matrix to form a fuel cell unit. Electrolyte can be added to the matrix by depositing electrolyte on the exposed matrix area between the electrodes. The electrolyte will then wick through and saturate the thin matrix between the electrodes. While the older conventional matrix material comprised a multiplicity of finely divided ceramic material such as magnesium oxide particles, lithium aluminate particles or aluminum oxide particles, the recently developed thin-walled matrix material includes, in addition to the ceramic particles, binders and reaction products such as alkali metal aluminates and silicates.

Problems have sometimes occurred when using molten carbonate electrolyte fuel cells with this newly developed matrix material, particularly in conjunction with the use of anodes with compound cross-sectional configurations, such as corrugations, folds, or a multiplicity of cylindricallike members which are fastened together. It has been found that when these particular anodes are used in conjunction with the newly developed matrix material, the molten carbonate electrolyte will frequently wick more rapidly through the anodes than it will through the matrix. This action will result in flooding of the anode and cause a substantial decrease in efficiency of the fuel cell. This flooding generally occurs because electrolyte will only wick a short distance through the matrix before substantial reaction products between materials in the newly developed matrix, such as silicates, will react with the electrolyte and form reaction products which in turn plug the pores of the matrix. After this, the electrolyte will wick around the plugged areas directly to the anode. The capillaries formed by the folds and/or creases of the anode will cause the electrolyte to then wick up the anode until it is saturated.

Therefore, one object of this invention is to provide a method of improving the efficiency of fuel cells in which the electrolyte contacting the electrodes is carried by a thin solid porous matrix material.

Another object of this invention is to provide a novel system for controlling the flow of proper amounts of electrolyte to electrodes in fuel cells.

According to this invention electrolyte is supplied to the electrodes of a fuel cell which has at least one porous anode and at least one porous cathode separated by an electrolyte-carrying matrix, by the action of permeable capillary conduit means which communicate from an electrolyte supply uniformly along the length of the matrix between the electrodes. Thus, the capillary conduit means of this invention function to transport electrolyte along the length of the matrix between the electrodes and are provided with permeable walls which will deliver electrolyte uniformly to the matrix.

Preferably the permeable capillary conduit means will communicate uniformly along the length of the matrix adjacent the cathode. The electrolyte delivered by the permeable capillary conduits will thereby wet the cathode and uniformly supply electrolyte to the matrix at whatever rate the matrix will absorb the electrolyte, thus preventing flooding of the anode but assuring uniform contact of the anode by the electrolyte at points where the anode contacts the matrix.

According to a preferred embodiment of this invention a pair of screens which are fastened together and held a fixed distance apart to assure good capillary action are positioned between the cathode and the inert matrix. The screens communicate with an electrolyte supply and thereby allow electrolyte to be uniformly distributed to the matrix and the electrodes of the fuel cell as described above. Even more preferably, a second pair of these screens which communicate with the electrolyte supply are positioned along the other side of the cathode to assure that the cathode is uniformly saturated with electrolyte.

This invention can be more easily understood from a study of the drawings in which:

FIG. 1 is a perspective view of a fuel cell unit which includes the electrolyte control system of this invention;

FIG. 2 is a sectional view along lines 2—2 of FIG. 1;

FIG. 3 is a sectional view along lines 3—3 of FIG. 1.

Now referring to FIGS. 1 and 2 fuel cell unit 10 generally comprises a boxlike structure containing four parallel connected fuel cells. It is to be understood that any number of fuel cells connected in parallel and/or in series can be utilized with this invention. Thus, the number of fuel cells in unit 10 together with the electrical interconnections therebetween is not intended to limit the scope of this invention.

Enclosures 11 and 12 which carry cavities 13 and 14, respectively, are connected at opposite ends of fuel cell unit 10. Fuel inlet conduit 15 communicates through enclosure 11 and has annular electric terminal 16 operatively attached thereto. In similar manner, fuel outlet conduit 17 communicates through enclosure 12 and has annular electric terminal 18 operatively connected thereto. Electrical conductive wires lead from terminal 16 and terminal 18 to a suitable circuit.

Now referring to FIGS. 2 and 3, the internal structure of fuel cell unit 10 is illustrated in detail. FIG. 2 illustrates the cathode structure, with the anodes omitted for purposes of clarity and convenience. In FIG. 3 the anode structure is illustrated, with the cathodes omitted. Anodes 19 and 20 generally comprise a single sheet-metal screen formed into a series of teardrop-shaped folds. The teardrop-shaped folds are held together by braising or spot welding points of contact such as illustrated at points 21. This folded pattern allows reactant fuel to freely flow through spaces 22. Alternatively, a variety of other electrode structures can be utilized for electrodes 19 and 20. For example, a coarse wire mesh similar to a kitchen scour pad can be used, or, a number of cylindrical or tubular-shaped pieces stacked one on another can be used. Electrodes 19 and 20 can be made from any suitable anode material, for example, 80 to 120 mesh nickel screen.

Anodes 19 and 20 carry matrices 23 and 24 molded around the outside periphery thereof as illustrated in FIG. 3. These matrices can be made from any suitable moldable matrix composition known in the art. Suitable such compositions are disclosed in copending U.S. Pat. application Ser. No. 601,782, filed Dec. 14, 1966. For example, the matrix material can be prepared by mixing powdered sodium lithium carbonate, aluminum oxide, magnesium oxide, and silicon oxide ($SiO_2$) in a dry state, heating the mixture in an air atmosphere for about 4 hours at about 800° C., and regrinding the resulting sintered material back to a powder. The sintering operation causes the starting materials to partially react, thereby resulting in a mixture of unreacted sodium lithium carbonate, aluminum oxide, and magnesium oxide with the reaction products, lithium aluminate, lithium silicate, sodium aluminate, and sodium silicate. A portion of this sintered material is then mixed with sodium silicate nd powdered aluminum, zinc, and chromium oxide. Sufficient water is then added to the mixture to make a slurry for ease of application to electrodes 19 and 20. The slurry is then applied around electrodes 19 and 20 and allowed to dry and harden into rigid but yet porous electrolyte matrix bodies.

Cathodes 25, 26, and 27 are identical and generally comprise corrugated member welded between two side sheet members. Electrodes 25, 26 and 27 serve as the cathodes for fuel cell unit 10 and can be made from any suitable porous material known in the art such as 80 to 150 mesh silver plated stainless steel screen, for example. As illustrated in the drawings, every electrode in unit 10 except electrodes 25 and 27 serves as a dual electrode for two cells.

Electrolyte-permeable capillary conduits 28 are positioned on both sides of electrodes 25, 26, and 27. Electrolyte-permeable capillary conduits 28 comprise a sheet of screen material 29 which has been welded to the side sheet members of corrugated electrodes 25, 26, and 27 at points 30 by a suitable method, such as roll welding. Weld points 30 can be spaced between the two screens as desired to obtain good wicking of the electrolyte, for example, on 1/16 to ¼ inch centers. In this preferred embodiment, screens 29 comprise a corrosion-resistant material, such as a corrosion-resistant stainless steel screen. It is generally preferred to use from 80 to 150 mesh stainless steel screens as screen members 29. As shown in FIG. 3, screen members 39 which are positioned adjacent matrix 23 and matrix 24 extend around the sides of channels 31, and are welded thereto at points 32. The upper ends 33 of screen members 29 which are positioned on the outside edges of electrodes 25 and 27 extend a short distance above the top of electrodes 25 and 27, respectively. Thus, when unit 10 is impregnated with electrolyte by depositing a suitable electrolyte such as molten carbonate on top of unit 10 within rails 31 and along extensions 33, the electrolyte will immediately wick through capillary conduits 28 and become evenly distributed along the length of matrices 23 and 24 between the anodes and cathodes. Additionally, the electrolyte will uniformly wet the cathodes 25, 26, and 27.

The capillary pore size carried by permeable capillary conduits 28 can be varied by techniques known in the art to satisfy the wicking and capillary characteristics of any particular electrolyte. For example, consider the equation: $\gamma = \frac{1}{2} hgdr$, where $\gamma$ equals surface tension of a liquid; $h$ equals height of the column of the liquid above the lower liquid level; $g$ equals acceleration due to gravity; $d$ equals density of the liquid; and $r$ equals radius of the capillary pore. By rearrangement of the equation, it can be seen that the capillary pore radius is directly proportional to the surface tension of the liquid and inversely proportional to the height of the column, the gravitational acceleration and the liquid density. Consequently, with proper sizing the desired amount of capillarity can be obtained for a given electrolyte. For example, with the capillary screens illustrated in the drawing the distance between the screens can vary from 0.01–0.005 inch and yield good results with a sodium-lithium carbonate molten electrolyte.

It must be noted that the number of capillary conduits 28 adjacent electrodes 25, 26, and 27 is not intended to limit the scope of this invention. For example, capillary conduits 28 need only be placed adjacent electrodes 25, 26, and 27 at points between the electrodes and matrices. In some operations it may be desired to place capillary conduit 28 within the matrix between the electrodes. However, according to a preferred embodiment of this invention, permeable capillary conduits 28 are placed on both sides of electrodes 25, 26, and 27. This arrangement will allow electrolyte to flow through electrolyte permeable capillary conduits 28, uniformly wet electrodes 25, 26, and 27 (the cathodes) and uniformly distribute electrolyte to the surface of matrices 23 and 24. The electrolyte will then wick evenly through porous matrices 23 and 24 by capillary action and contact the curved teardrop-shaped convolutions of electrodes 19 and 20 which are positioned adjacent the matrices. Makeup electrolyte will be continuously fed to the matrices during long term cell operation at whatever rate the matrices will absorb the electrolyte.

Now referring to FIG. 2, the electrical connections between the electrodes and electrical terminals 16 and 18 are illustrated in detail. Conductive end plate 34 is connected such as by welding with conductive enclosure 11. Slots 35 within conductive end plate 34 communicate from chamber 13 to spaces 22 within electrodes 19 and 20. Flanges 35 which are operatively connected to electrodes 19 and 20 are connected in similar manner such as by welding to conductive end plate 34. It is noted that electrodes 25, 26, and 27 are spaced from and thereby insulated from conductive end plate 34. Conductive end plate 36 is connected such as by welding to conductive enclosure 12 and thereby communicates with electric terminal 18. Slots 37 communicate between chamber 14 and spaces 22 of electrodes 19 and 20. Electrodes 25, 26, and 27 are operatively connected such as by welding to conductive end plate 36. Electrodes 19 and 20 are spaced from conductive end plate 36.

In operation, fuel cell unit 10 is placed within a suitable environment wherein an oxidizer reactant will continuously pass through electrodes 25, 26, and 27. Electrodes 19 and 20 are provided with a suitable fuel via inlet conduit 15 and chamber 14. Fuel cell unit 10 will function with a variety of reactants, but the preferred system is a fuel feed comprising hydrogen and an oxidizer mixture comprising oxygen and carbon dioxide. The hydrogen can be either pure or mixed along with various other gases such as nitrogen, carbon dioxide, carbon monoxide, light hydrocarbons, water vapor, and the like. The oxygen can be either pure or supplied as air. This particular system can effectively use various alkali metal carbonates as electrolytes. A preferred electrolyte is a eutectic mixture of sodium carbonate and lithium carbonate, e.g., 50 percent molar sodium carbonate and 50 percent molar lithium carbonate having a melting point of about 500° C. Fuel cell unit 10 is placed within a suitable heating device which is supplied with the oxidizer atmosphere and maintained at a temperature in the vicinity of 600° C., e.g., about 650° C. Merely placing fuel cell unit 10 within a ceramic wall oven (or other insulated casing means) which is provided with a gaseous flow of oxygen and carbon dioxide, or air and carbon dioxide, in a direction parallel to electrodes 25, 26, and 27, will suffice.

Matrices 23 and 24 are impregnated with electrolyte such as for example, by pouring the molten carbonate eutectic upon channels 31 and screen extensions 33. The carbonate electrolyte will wick through permeable capillary conduits 28 in a manner described above to thereby wet electrodes 25, 26, and 27, and matrices 23 and 24.

The hydrogen feed gas is then passed through inlet conduit 15, into chamber 13 and through slots 35, spaces 22 of electrodes 19 and 20, to chamber 14. Since the capillary action of capillary conduits 28 has uniformly distributed the electrolyte to the surface of matrices 23 and 24 between adjacent electrodes, the electrolyte will wick through the matrices and wet electrodes 19 and 20 only at the points where they contact the matrices. Thus, a triple interface within spaces 22 will occur and the hydrogen gas will diffuse through the nickel screen to the liquid electrolyte interface. Since the nickel screens serve not only as an electrode and a porous interface between fuel and electrolyte, but also as a catalyst to promote the half cell oxidation reaction, greater efficiency of the anode will result than in conventional cells wherein the anode is flooded or substantially covered with thick liquid electrolyte film. The reaction occurring in fuel electrodes 19 and 20 (the anodes) is as follows:

$$H_2 + CO_3^= \rightarrow H_2O + CO_2 + 2e$$

The oxygen and carbon dioxide which passes through electrodes 25, 26, and 27 and surrounds fuel cell unit 10 within the heating device will contact the flooded electrodes 25, 26, and 27 (the cathodes) and react as follows:

$$1/2\ O_2 + CO_2 + 2e \rightarrow CO_3^=$$

It must be understood that the particular screen-type capillary conduits illustrated in the drawings are not intended to limit the scope of this invention. Any suitable type electrolyte permeable capillary conduits can be used in the practice of this invention. For example, a series of porous capillary tubes, twisted strands, or a sheet of woven material can be used as the permeable capillary conduits of the invention. When using a sheet of woven material it is generally preferred that relatively larger strands be woven in the lengthwise direction to relatively smaller strands in the crosswise direction so that the relatively larger strands will communicate from the electrolyte supply to the matrix. Also, the cathode can be constructed with a series of porous wicking tubes as an integral part thereof, and for example, silver plating can be applied over the entire surface without seriously affecting the wicking of the electrolyte by the capillary tubes.

Additionally, in the shorter term fuel cell operations wherein makeup electrolyte is not essential, it is only necessary to have the permeable capillary conduits communicating with the matrix for the relatively short period of time that is required for the matrix to become wetted with electrolyte. In these operations, the capillary conduits used in this invention can be made of a material which will react with the electrolyte once it has been delivered to the matrix to form an oxide which is nondeleterious to fuel cell operation. Examples of these types of capillaries include zirconia tape or a woven cloth made from high alumina fibers. It is only necessary that the cloth or tape chosen not react so rapidly as to form a dam or blockage of the capillary before the matrix is saturated with electrolyte.

While this invention has been described in reference to its preferred embodiments, it is to be understood that various modifications within the scope of the appended claims will now be apparent to one skilled in the art upon reading the specification.

I claim:

1. A fuel cell unit comprising:
   a. at least one porous anode spaced from at least one porous cathode by a porous electrolyte support matrix.
   Said anode is a sheet of electrically conductive material which is folded into a teardrop pattern, a portion of which is positioned within said porous matrix, the other portion providing passages for a reactant;
   b. means to supply a reactant to said passages of gaseous to said anode and means to supply a gaseous reactant to said cathode;
   c. electrolyte supply means; and
   d. permeable capillary conduit means operatively communicating between said electrolyte supply means uniformly to points only said porous electrolyte support matrix between said porous electrolyte support matrix and said cathode.

2. The fuel cell of claim 1 wherein said permeable capillary conduit means comprises a pair of screen members operatively fastened together to form capillary pores.